(12) United States Patent
Inoue

(10) Patent No.: US 6,654,146 B1
(45) Date of Patent: Nov. 25, 2003

(54) METHOD OF AND APPARATUS FOR GENERATING HALFTONE DOT IMAGE

(75) Inventor: Yoshiaki Inoue, Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/345,763

(22) Filed: Jul. 1, 1999

(30) Foreign Application Priority Data

Jul. 3, 1998 (JP) .......................................... 10-188683

(51) Int. Cl.[7] .............................................. G06K 15/00
(52) U.S. Cl. ...................................... 358/3.07; 358/536
(58) Field of Search ........................ 358/1.9, 3.06–3.07, 358/3.09, 3.13, 3.23–3.24, 534–536; 382/237, 299–300

(56) References Cited

U.S. PATENT DOCUMENTS 5,734,801 A * 3/1998 Noguchi et al. ............. 358/1.9
5,831,626 A * 11/1998 Sano et al. .................. 345/596
6,026,216 A * 2/2000 Ohtsuka et al. .............. 358/1.9

FOREIGN PATENT DOCUMENTS

JP          2000289005 A * 10/2000 ............ B27K/5/00

* cited by examiner

Primary Examiner—Thomas D. Lee
Assistant Examiner—Stephen Brinich
(74) Attorney, Agent, or Firm—Sughrue Mion, PLLC

(57) ABSTRACT

Using a resolution supplied from an image output apparatus and ruling information supplied from a ruling information storage unit, a screen ruling of threshold data stored in a threshold data storage unit is determined, and threshold data which provides a screen ruling closest to a desired screen ruling supplied from a screen ruling input unit is selected and supplied to a binarization processor which is supplied with multivalued image data from an image processing apparatus. The binarization processor compares the selected threshold data and the multivalued image data to generate binary image data.

13 Claims, 7 Drawing Sheets

FIG. 3

| THRESHOLD DATA NUMBER | RULING INFORMATION |
|---|---|
| TH1 | $\alpha 1$ |
| TH2 | $\alpha 2$ |
| ⋮ | ⋮ |
| THi | $\alpha i$ |
| ⋮ | ⋮ |

FIG. 6

| THRESHOLD DATA NUMBER | SCREEN RULING | RESOLUTION |
|---|---|---|
| TH1 | r1 | R1 |
| TH2 | r2 | R2 |
| ⋮ | ⋮ | ⋮ |
| THi | ri | Ri |
| ⋮ | ⋮ | ⋮ |

FIG. 7

| 1000DPI | Y | M | C | K |
|---|---|---|---|---|
| 85LPI | TH1 | TH2 | TH3 | TH4 |
| 100LPI | TH5 | TH6 | TH7 | TH8 |
| 120LPI | TH9 | ... | ... | ... |
| 133LPI | ... | ... | ... | ... |
| 150LPI | TH10 | TH11 | TH12 | TH13 |

FIG. 8

| 2000DPI | Y | M | C | K |
|---|---|---|---|---|
| 175LPI | TH1 | TH2 | TH3 | TH4 |
| 200LPI | TH5 | TH6 | TH7 | TH8 |
| 300LPI | TH10 | TH11 | TH12 | TH13 |
| ... | ... | ... | ... | ... |

METHOD OF AND APPARATUS FOR GENERATING HALFTONE DOT IMAGE

BACKGROUND OF THE INVENTION

1. Field of the Invention

The present invention relates to a method of and an apparatus for generating a halftone dot image having a desired screen ruling.

2. Description of the Related Art

In the fields of desktop printing and printing/platemaking technology, there has been employed an image processing system which reads a color subject with a scanner to obtain input image data, effects a desired image processing process on the input image data to produce output image data, and if the image data is a continuous gradation image data, converts the image data into halftone dot image data, which is supplied to an image output device such as a plotter, a printer, or the like to output an image on a recording medium.

The image processing system is constructed of various devices. Because of a recent rapid progress toward open industry standards for such devices, various devices manufactured by different manufacturers can be connected together to realize the image processing system. For example, any of various different image output devices can be connected to an image binarizer which converts multi-valued image data into binary image data for thereby generating a halftone dot image.

Different image output devices tend to have different resolutions. If image data is reproduced by different image output devices having different resolutions, then some halftone dot images cannot be generated with a desired screen ruling.

For example, it is assumed that a halftone dot image with a screen ruling of 100 LPI (Lines Per Inch) is to be outputted. If an image output device having a resolution of 1000 DPI (Dots Per Inch) is used to output a halftone dot image, then an image binarizer generates image data of 10×10 dots per halftone dot, and the image output device outputs a halftone dot image based on the image data from the image binarizer. If an image output device having a resolution of 800 DPI (Dots Per Inch) is used, it outputs a halftone dot image having a screen ruling of 80 LPI. As described above, when the same threshold data is employed to generate binary image data from the image binarizer, if an image output device having a different resolution is used to output a halftone dot image based on the binary image data, then the halftone dot image has a different screen ruling, and hence is different from a desired image.

The above problem can be solved if the image binarizer has a number of sets of threshold data in order to cope with the resolutions and output image screen rulings of different image output devices that can possibly be connected to the image binarizer. However, the image binarizer needs to have a sufficiently large memory capacity for storing such a number of sets of threshold data, and it takes a long period of time to generate those sets of threshold data.

SUMMARY OF THE INVENTION

It is a general object of the present invention to provide a method of and an apparatus for generating a halftone dot image having a desired screen ruling with a reduced amount of threshold data that are generated in a reduced period of time and stored in a reduced storage capacity, while coping with the different resolutions of various image output devices.

Another object of the present invention is to provide a method of and an apparatus for generating a halftone dot image having a screen ruling which is closest to a desired screen ruling.

The above and other objects, features, and advantages of the present invention will become more apparent from the following description when taken in conjunction with the accompanying drawings in which preferred embodiments of the present invention are shown by way of example.

BRIEF DESCRIPTION OF THE DRAWINGS

FIG. 3 is a diagram illustrative of data stored in a ruling information storage unit in the image binarizer shown in FIG. 2;

FIG. 6 is a diagram illustrative of data stored in a threshold data selection table storage unit in the image binarizer shown in FIG. 5;

FIG. 7 is a diagram illustrative of a threshold data selection table stored in the threshold data selection table storage unit; and FIG. 8 is a diagram illustrative of another threshold data selection table stored in the threshold data selection table storage unit.

DESCRIPTION OF THE PREFERRED EMBODIMENTS

Figure 1:
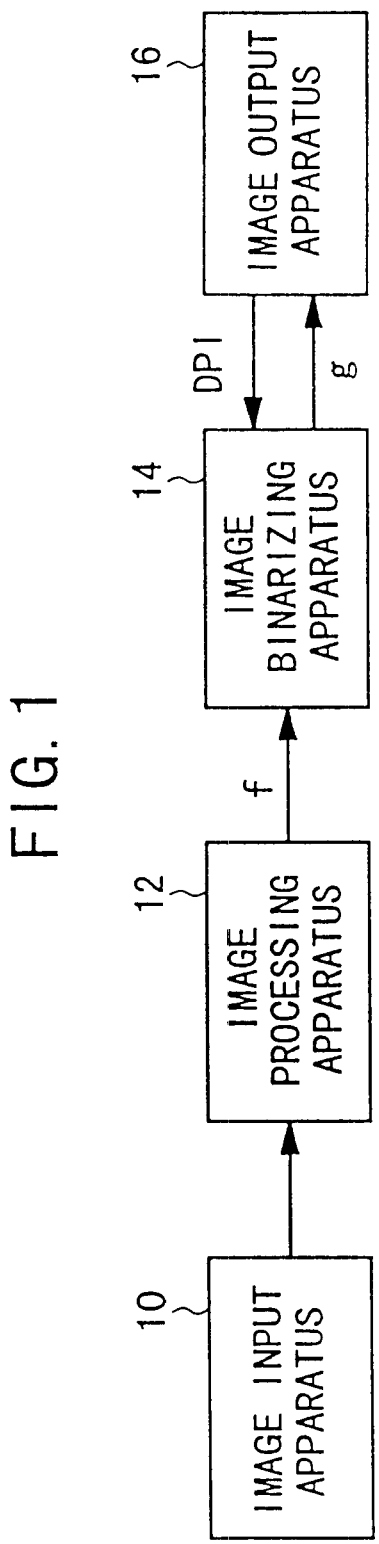
FIG. 1 is a block diagram of an image processing system which incorporates an apparatus for generating a halftone dot image according to an embodiment of the present invention.

FIG. 1 shows in block form an image processing system which incorporates an apparatus for generating a halftone dot image according to an embodiment of the present invention.

The image processing system comprises an image input apparatus 10 such as a scanner, an imagesetter, or the like, an image processing apparatus 12 for processing image data entered by the image input apparatus 10 according to various image processing processes including color conversion, image size enlargement, image size reduction, etc., an image binarizing apparatus 14 for converting multivalued image data f processed by the image processing apparatus 12 into binary image data g as. halftone dot image data, and an image output apparatus 16 for outputting a halftone dot image on a film or the like based on the binary image data g.

Figure 2:
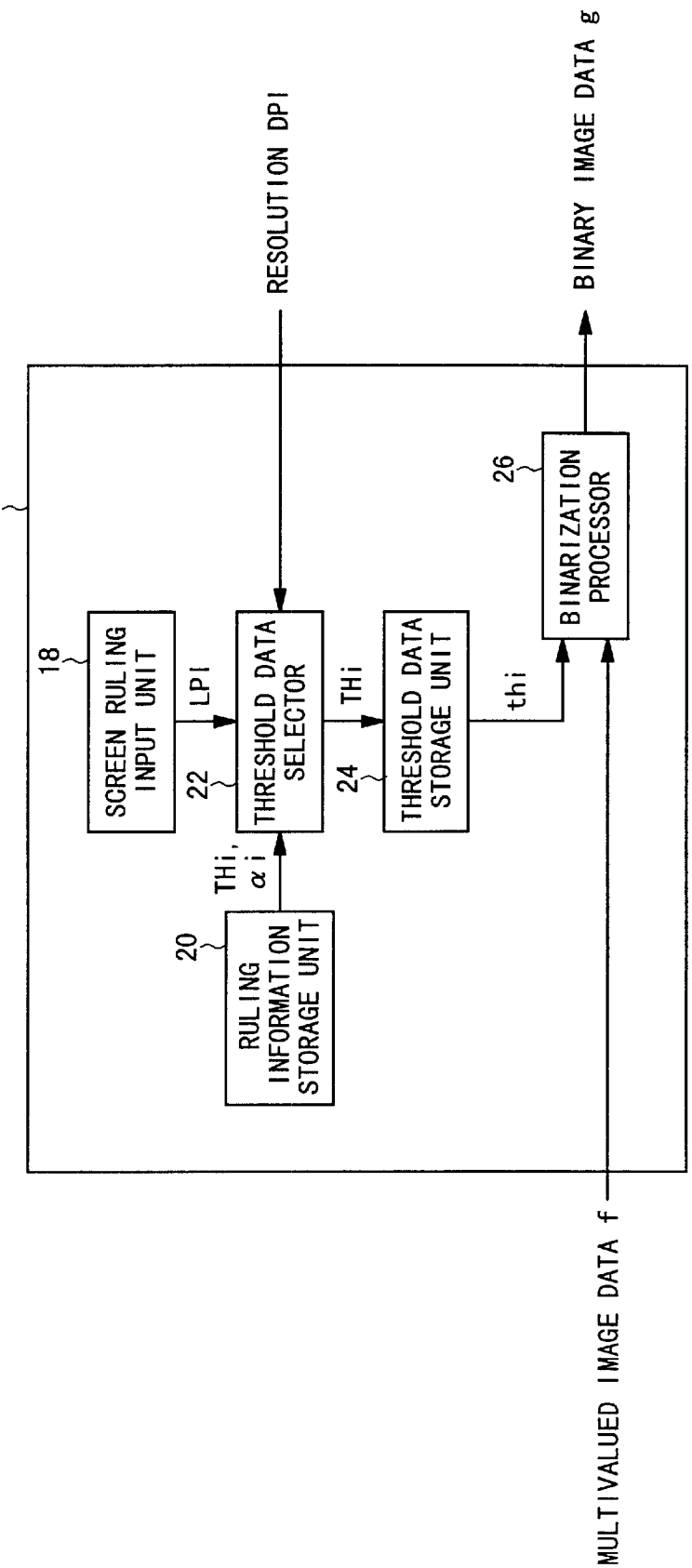
FIG. 2 is a block diagram of an image binarizer in the image processing system shown in FIG. 1.

FIG. 2 shows the image binarizing apparatus 14 in detailed block form. The image binarizing apparatus 14 comprises a screen ruling input unit 18 for establishing a desired screen ruling LPI for halftone dot images, a ruling information storage unit 20 (see FIG. 3) for storing the ratios of screen rulings to resolutions as ruling information $\alpha i$ (i=1, 2, . . . ) with respect to respective numbers THi (i=1, 2, . . . ) of sets of threshold data thi (i=1, 2, . . . ) and a threshold data selector 22 for determining ruling information $\alpha i$ capable of obtaining a screen ruling closest to a desired screen ruling LPI supplied from the screen ruling input unit 18 based on a resolution DPI supplied from the image output apparatus 16, and selecting the number THi of a set of threshold data thi corresponding to the determined ruling information αi. The ruling information αi stored in the ruling information storage unit 20 may be established as a multiple, by a constant, of the ratio of a supplied screen ruling LPI to a supplied resolution DPI.

There are a plurality of sets of threshold data thi established for respective numbers THi with respect to combinations of plural resolutions and plural screen rulings, and the established sets of threshold data thi are stored in a threshold data storage unit 24. If the multivalued image data f comprises color image data, then the sets of threshold data thi are established with respect to each of the colors C, M, Y, K.

The number THi of the set of threshold data thi which is selected by the threshold data selector 22 is supplied to the threshold data storage unit 24, from which desired threshold data thi corresponding to the selected number THi is read and supplied to a binarization processor 26. The binarization processor 26 compares the multivalued image data f supplied from the image processing apparatus 12 with the threshold data thi to generate binary image data g.

Operation of the image processing system which incorporates the apparatus for generating a halftone dot image according to the present embodiment will be described below.

Image data read by the image input apparatus 10 is processed by the image processing apparatus 12, and then supplied as multivalued image data f to the image binarizing apparatus 14.

The image binarizing apparatus 14 is supplied with a desired screen ruling LPI for a halftone dot image which has been entered by the operator through the screen ruling input unit 18 and a resolution DPI from the image output apparatus 16 connected to the image binarizing apparatus 14. The screen ruling LPI and the resolution DPI thus supplied are supplied to the threshold data selector 22.

Figure 4:
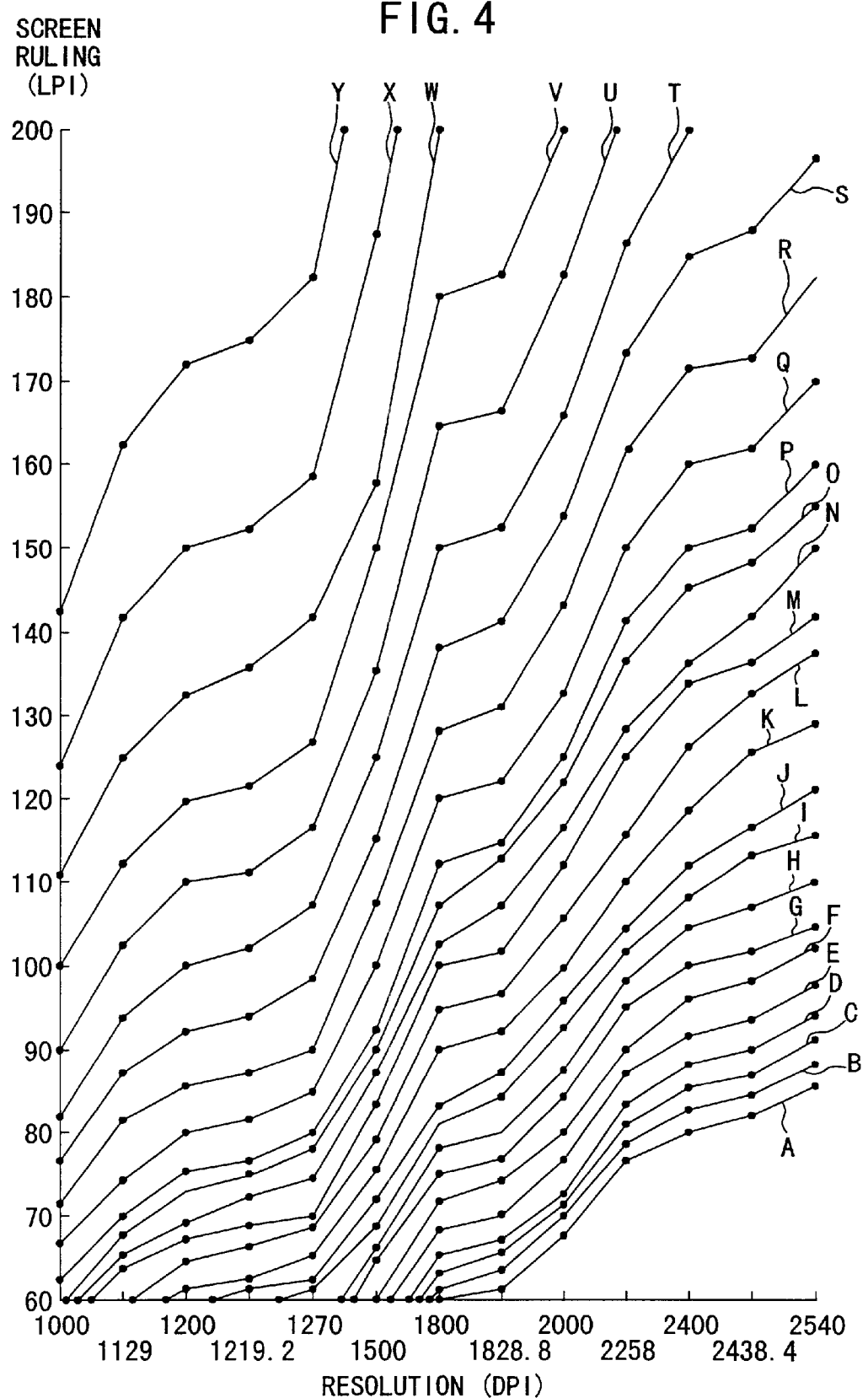
FIG. 4 is a diagram showing the relationship between resolutions and screen rulings with respect to established threshold data.

The threshold data selector 22 multiplies the supplied resolution DPI by ruling information αi (i=1, 2, . . . ) read from the ruling information storage unit 20, thus determining screen rulings LPIi (i=1, 2, . . . ) at the resolution DPI using the set of threshold data thi (i=1, 2, . . . ). The set of threshold data thi is determined with respect to the particular resolution and screen ruling. If the resolution DPI of the image output apparatus 16 changes, then the screen ruling LPIi of an actually outputted halftone dot image changes even though the threshold data thi remain the same. FIG. 4 shows the relationship between resolutions and screen rulings of outputted halftone dot images with respect to plural sets A–Y of threshold data thi.

The threshold data selector 22 compares the desired screen ruling LPI supplied from the screen ruling input unit 18 with the screen rulings LPIi as the products of the resolution DPI and the ruling information αi, selects the number THi of the set of threshold data thi which provides a screen ruling LPIi closest to the desired screen ruling LPI, and outputs the selected number THi to the threshold data storage unit 24.

Alternatively, the threshold data selector 22 may determine ruling information by dividing the desired screen ruling LPI by the resolution DPI and select threshold data thi from the number THi with respect to ruling information αi closest to the determined ruling information.

The threshold data storage unit 24 supplies the threshold data thi selected by the number THi to the binarization processor 26. The binarization processor 26 is also supplied with the multivalued image data f. The binarization processor 26 compares the magnitudes of the threshold data thi and the multivalued image data f with each other, thereby generating binary image data g as halftone dot image data, and outputs the binary image data g to the image output apparatus 16. Based on the binary image data g, the image output apparatus 16 generates a halftone dot image which has the desired screen ruling LPI or the screen ruling LPIi close thereto.

In the above embodiment, the threshold data selector 22 selects a set of threshold data thi capable of obtaining a screen ruling LPIi closest to a desired screen ruling LPI. Therefore, it is possible to produce a halftone dot image having the screen ruling LPIi closest to the desired screen ruling LPI using a minimum amount required of threshold data thi. Since it is not necessary to generate sets of threshold data thi for all possible combinations of resolutions and screen rulings, the period of time required to generate necessary threshold data thi is greatly reduced. The threshold data storage unit 24 for storing such a large amount of threshold data thi for all possible combinations of resolutions and screen rulings is not required.

Figure 5:
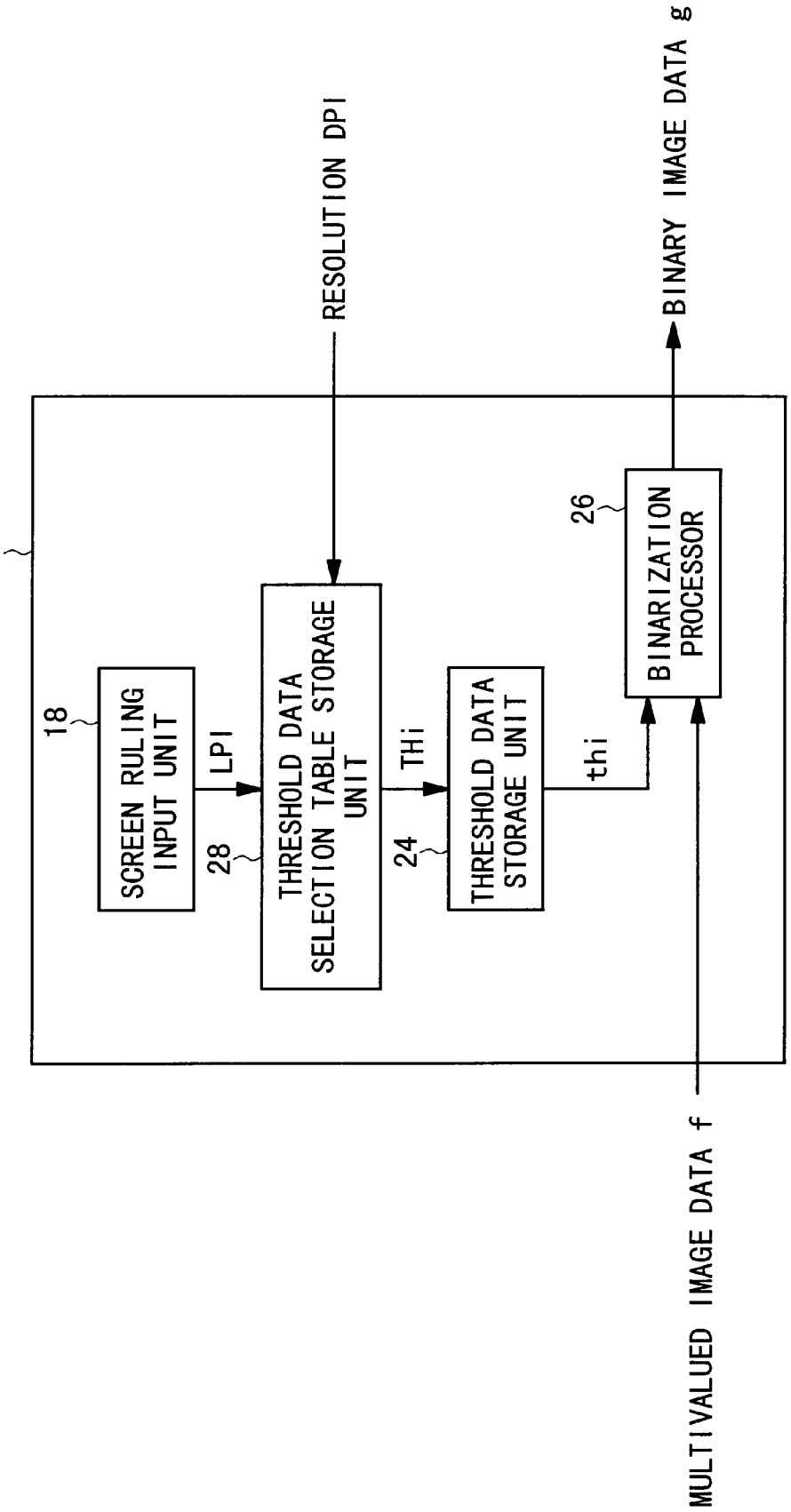
FIG. 5 is a block diagram of an image binarizer according to another embodiment of the present invention.

The image binarizing apparatus 14 may be arranged as shown in FIG. 5 thereby to produce a halftone dot image having the screen ruling LPIi closest to the desired screen ruling LPI using a minimum amount required of threshold data thi.

Based on the relationship shown in FIG. 4, the relationship between screen rulings ri (i=1, 2, . . . ), resolutions Ri (i=1, 2, . . . ), and numbers THi (i=1, 2, . . . ) of sets of threshold data thi corresponding to combinations of those screen rulings and resolutions are stored as a threshold data selection table in a threshold data selection table storage unit 28 shown in FIG. 5. In the threshold data selection table, the number THi (i=1, 2, . . . ) of one set of threshold data thi is associated with the ratio of a screen ruling ri to a resolution Ri, or one ruling information αi (i=1, 2, . . . ) which is a multiple, by a constant, of the ratio (see FIG. 6).

For example, FIG. 7 shows a threshold data selection table of numbers THi of sets of threshold data thi with respect to screen rulings ri for the respective colors Y, M, C, K at the time the resolution Ri is 1000 DPI. FIG. 8 shows a threshold data selection table of numbers THi of sets of threshold data thi with respect to screen rulings ri for the respective colors Y, M, C, K at the time the resolution Ri is 2000 DPI. In these threshold data selection tables, the sets (whose numbers range from TH1 to TH4) of threshold data thi for the resolution of 1000 DPI and the screen ruling of 85 LPI are the same as the sets of threshold data thi for the resolution of 2000 DPI and the screen ruling of 175 LPI. With respect to these combinations, it is possible to generate halftone dot images having respective resolutions of 1000 DPI and 2000 DPI using the same threshold data thi. By establishing the above threshold data selection tables in the threshold data selection table storage unit 28, the threshold data storage unit 24 can have a reduced storage capacity.

When the threshold data selection table storage unit 28 is supplied with data of a resolution DPI from the image output apparatus 16 and also with data of a desired screen ruling LPI from the screen ruling input unit 18, the threshold data selection table storage unit 28 selects a number THi from the corresponding resolution Ri and screen ruling ri shown in FIG. 6, and supplies the selected number THi to the threshold data storage unit 24. The threshold data storage unit 24 reads a set of threshold data thi according to the number THi, and supplies the read set of threshold data thi to the binarization processor 26. If there is no corresponding resolution Ri and screen ruling ri in the threshold data selection table storage unit 28, then the threshold data selection table storage unit 28 selects a resolution Ri closest to the resolution DPI and then a screen ruling ri closest to the desired screen ruling LPI for the resolution Ri. Thereafter, the threshold data storage unit 24 selects the number THi of a set of threshold data thi which is identified by the combination of the resolution Ri and the screen ruling ri.

The binarization processor 26 compares the magnitudes of the threshold data thi from the threshold data storage unit 24 and the multivalued image data f from the image processing apparatus 12 with each other, and outputs binary image data g to the image output apparatus 16. Based on the binary image data g, the image output apparatus 16 generates a halftone dot image which has the desired screen ruling LPI or the screen ruling ri close thereto.

In the illustrated embodiments, threshold data are selected by the hardware arrangements shown in FIGS. 2 and 5. However, threshold data may be selected by a software-implemented system.

Although certain preferred embodiments of the present invention have been shown and described in detail, it should be understood that various changes and modifications may be made therein without departing from the scope of the appended claims.

What is claimed is:

1. An apparatus for generating a halftone dot image, comprising:

a threshold data storage unit for storing a plurality of sets of threshold data;

a ruling information storage unit for storing the ratio of a screen ruling to a resolution or a multiple, by a constant, of said ratio as ruling information with respect to each of the threshold data;

threshold data selecting means for determining ruling information capable of obtaining a screen ruling closest to a desired screen ruling according to a given resolution, and selecting threshold data which corresponds to the determined ruling information, whereby a halftone dot image can be generated using the selected threshold data.

2. An apparatus according to claim 1, further comprising input means for entering said desired screen ruling, and an image output apparatus connected to said threshold data selecting means, for generating said halftone dot image, said given resolution being supplied from said image output apparatus.

3. The apparatus according to claim 2, wherein the threshold data selecting means selects one of the plural sets of threshold data based on a ratio of the desired screen ruling provided by the input means and a resolution of the given resolution supplied from said image output apparatus.

4. The apparatus according to claim 1, wherein the plurality of sets of threshold data are prestored in said threshold data storage unit, and the ruling information storage unit associates the ratio or the multiple of the ratio with one of the prestored plural sets of threshold data.

5. The apparatus of claim 4, wherein the screen ruling comprises a value representing lines per linear unit, and the resolution comprises a value representing dots per unit area.

6. An apparatus for generating a halftone dot image, comprising:

a threshold data storage unit for storing a plurality of sets of threshold data;

a threshold data selection table storage unit for storing the relationship of at least one of the sets of threshold data established with respect to a plurality of combinations of screen rulings and resolutions as a threshold data selection table, and selecting threshold data corresponding to a combination of a screen ruling closest to a desired screen ruling and a given resolution, whereby a halftone dot image can be generated using the selected threshold data.

7. An apparatus according to claims 6, further comprising input means for entering said desired screen ruling, and an image output apparatus connected to said threshold data selecting means, for generating said halftone dot image, said given resolution being supplied from said image output apparatus.

8. The apparatus according to claim 7, wherein the threshold data selection table storage unit selects one of the plural sets of threshold data based on a ratio of the desired screen ruling provided by the input means and a resolution of the given resolution supplied from said image output apparatus.

9. An apparatus according to claim 6, wherein said threshold data selection table contains items of ruling information each representing the ratio of a screen ruling to a resolution, or a multiple, by a constant, of the ratio, in association with respective threshold data.

10. The apparatus according to claim 6, wherein the plurality of combinations of screen rulings and resolutions includes at least two different screen rulings and two different resolutions.

11. A method of generating a halftone dot image, comprising the steps of:

establishing a plurality of sets of threshold data with respect to ruling information which represents the ratio of a screen ruling to a resolution or a multiple, by a constant, of said ratio;

selecting threshold data with respect to ruling information capable of obtaining a screen ruling closest to a desired screen ruling when said desired screen ruling and a predetermined resolution are given; and generating a halftone dot image using the selected threshold data.

12. A method according to claim 11, further comprising the steps of:

determining ruling information when the product of said predetermined resolution and said ruling information is closest to said desired screen ruling; and selecting threshold data with respect to the determined ruling information.

13. A method of generating a halftone dot image, comprising the steps of:

establishing the relationship of at least one of the sets of threshold data established with respect to a plurality of combinations of screen rulings and resolutions as a threshold data selection table;

selecting threshold data established with respect to a relationship to a combination of a desired screen ruling and a predetermined resolution when said desired screen ruling and said predetermined resolution are given; and generating a halftone dot image using the selected threshold data.

\* \* \* \* \*

UNITED STATES PATENT AND TRADEMARK OFFICE
CERTIFICATE OF CORRECTION

PATENT NO.     : 6,654,146 B1                                                       Page 1 of 1
DATED          : November 25, 2003
INVENTOR(S)    : Yoshiaki Inoue It is certified that error appears in the above-identified patent and that said Letters Patent is hereby corrected as shown below:

<u>Title page,</u>
Item [56], References Cited, FOREIGN PATENT DOCUMENTS,
Should read -- JP   2000-83169  A  3/2000. --

Signed and Sealed this

Eighth Day of June, 2004

JON W. DUDAS
*Acting Director of the United States Patent and Trademark Office*